United States Patent Office 3,796,815
Patented Mar. 12, 1974

3,796,815
POURABLE EMULSION
Herbert Willem Lincklaen, Westenberg, and Johannes Henricus Maria Rek, Vlaardingen, Netherlands, assignors to Lever Brothers Company, New York, N.Y.
No Drawing. Filed Sept. 3, 1971, Ser. No. 177,873
Claims priority, application Great Britain, Sept. 8, 1970, 42,968/70
Int. Cl. A23d 3/00
U.S. Cl. 426—195                 9 Claims

ABSTRACT OF THE DISCLOSURE

The specification describes a pourable margarine which shows a significant reduction in spattering behavior during frying and which has an improved stability against oil separation at relatively high use temperatures (e.g. about 20 to 35° C.). The pourable margarine contains about 20% by weight of an aqueous phase and about 80% by weight of a fatty phase. The fatty phase contains about 90 to 99.5% by weight of a liquid vegetable oil and about 10 to 0.5% by weight of a hard fat component. The aqueous phase contains a phosphatide from 5–35% by weight of which is a monoacylglycerophosphatide whose acyl group is derived from a fatty acid having at least 12 carbon atoms.

BACKGROUND OF THE INVENTION

Field of the invention

The invention relates to pourable emulsions having improved stability against oil separation. In particular the invention relates to pourable margarine of the water-in-oil type and to a process for the preparation theerof. Pourable margarines which are mainly of importance for frying purposes should contain phosphatide or derivatives thereof to improve the spattering characteristics.

Conventional margarine is plastic at ambient temperature. This plasticity is mainly attributable to the nature of the fatty phase of the water-in-oil emulsion constituting margarine, and particularly to the presence of substantial proportions of fatty matter which exists in the solid state at ambient temperatures but also to a great extent to the presence of emulsifiers in the fatty phase.

It is generally accepted that the glycide crystals of the fatty matter in plastic margarines are present as a three dimensional solid network in which liquid oils and droplets of the aqueous phase are enclosed and that this arrangement forms an important contribution to the stability of the margarine emulsion against oil separation.

Contrary to plastic margarines, in which both the nature of the fatty phase and the presence of emulsifiers therein provide the stability of the emulsion against oils separation, in pourable margarines neither the amount of hard fat that can be incorporated in such compositions nor the presence of emulsifiers in the fatty phase can sufficiently avoid oil separation especially at high use temperatures (20–35° C.).

The prior art

In U.S. patent specification 3,338,720 (Michael J. Pichel) fluid margarine emulsions are described comprising 60–90% of a liquid glyceride oil having a cold test in excess of about eight hours, 40–10% of an aqueous phase containing milk solids, an emulsifier and about 0.75%–5% of a hard fat.

This patent is concerned with the emulsion-stabilizing effect of a minor proportion of hard fat, preferably hydrogenated rapeseed oil.

The maximum hard fat content which can be tolerated in pourable margarine is dependent on several factors e.g. the viscosity of the margarine required at storage and use conditions, the type and melting point of the hard fat component used, and the process conditions under which the product is prepared. It is often found that the amount of hard fat necessary adequately to stabilize a pourable emulsion is incompatible with pourability. Thus pourable margarines so far proposed generally contain less hard fat than is necessary to stabilize the emulsion adequately against phase separation.

The emulsifiers disclosed in this patent specifiaction are lecithin and partial glyceride esters, which emulsifiers were dissolved in the fatty phase of the margarine.

Especially at relatively high use temperatures the additional stabilizing effect obtained by such emulsifiers is insufficient to avoid subtsantial oil separation.

SUMMARY OF THE INVENTION

It has now been found that the stability against oil separation of a pourable margarine can be improved by incorporating in the aqueous phase of the emulsion a phosphatide from 5–35% by weight of which is a monoacylglycerophosphatide whose acyl group is derived from a fatty acid having at least 12 carbon atoms. The pourable margarines of the invention thus contain a minor amount of said monoacylglycerophosphatides in the aqueous phase.

It is a great advantage of the products of the invention that they are not only excellently stable against oil separation at temperatures of up to 35° C., but that they also show a significant reduction in spattering behavior during frying.

Description of the invention

In this specification all parts and percentages are by weight.

The pourable margarine of the present invention preferably consists essentially of from about 25–15% by weight of an aqueous phase emulsified with a fatty phase, said fatty phase consisting essentially of from 90–99.5% by weight of a glyceride oil which is pourable at all temperatures from 0–35° C. and the remainder of a hard fat of a slip melting point of from 40–80° C. and a particle size of at least 90% of the hard fat particles of 0.1 to 30$\mu$, said aqueous phase containing a phosphatide, from 5–35% by weight of which is a monacylglycerophosphatide, whose acyl group is derived from a fatty acid having at least 12 carbon atoms.

Preferably the pourable margarine essentially consists of about 20% by weight of an aqueous phase emulsified with about 80% by weight of a fatty phase, said fatty phase consisting essentially of from 90–99.5% by weight of a liquid vegetable oil, at least 40% of the fatty acids of said liquid oil being polyunsaturated fatty acids, and the remainder of the fatty phase being a hard fatty of a slip melting point of from 40–80° C. and a particle size of at least 90% of the hard fat particles of 0.1 to 30$\mu$, said aqueous phase containing a phosphatide, from 5–35% by weight of which is a monoacylglycerophosphatide, whose acyl group is derived from a fatty acid having at least 12 carbon atoms, said monoacylglycerophosphatide being present in a proportion of 0.5–4% by weight of the aqueous phase.

Monoacylglycerophosphatides lack one of either the $\alpha$- or $\beta$-acyl groups of diacylglycerophosphatides, and typical of them are $\alpha$- and $\beta$-lysolectithin and $\alpha$- and $\beta$-lysocephalin. Monoacylglycerophosphatides can be prepared by synthesis or they can be obtained by the chemical hydrolysis (see e.g. British patent application No. 18163/68) or the enzymatic partial hydrolysis of diacylglycerophosphatides. $\alpha$-Monoacylglycerophosphatides can be prepared by the action on diacylglycerophosphatides of the enzyme phospholipase A (lecithinase A), which is conveniently prepared free of other enzymes by the partial heat inactivation of pancreatin. For this an aqueous suspension of pancreatin can be heated to from 70° to 80° C. for 30 minutes or to 90° C. for 10 minutes. The phosphatide used for the hydrolysis can be a phosphatide slime obtained in the production of plant oils, for example soybean oil or rapeseed oil, and steam or water treatment of the extracted oils at 95° C. to 100° C., or the crude phosphatide obtained by centrifuging such a phosphatide slime and drying the product under reduced pressure: a typical crude phosphatide thus obtained contains about 65% diacylglycerophosphatides and 35% oil.

In preparing an α-monoacylglycerophosphatide by enzymatic hydrolysis of such a phosphatide the latter is dissolved or suspended in water, or a solvent containing sufficient water, with from 0.1 to 25% of heat-treated pancreatin by weight of the phosphatide, and hydrolysis allowed to proceed at ambient temperature until a sufficient concentration of the monoacyl compound has been formed. Preferably the water contains calcium ions and tap water of 5 to 30° hardness is suitable. Fatty acid produced and contaminating fat can subsequently be removed by drying the product, for instance by evaporation under reduced pressure, and extracting it with acetone. A phosphatide containing from 5 to 45% of monoacylglycerophosphatide, depending on the degree of hydrolysis effected, can be obtained in this way. Only those products containing 5–35%, preferably 10–25% monoacylglycerophosphatide, are suitable for the purpose of the invention. The amount of monoacylglycerophosphatide in the product of hydrolysis can be determined by standard analytical methods, for instance thin-layer chromatography.

In practice the fatty acid acyl group of the monoacylglycerophosphatide has from 12 to 24 carbon atoms, and the monoacylglycerophosphatide produced from a natural phosphatide will generally have its monoacyl group derived from mixed fatty acids, especially those of 16 to 22 carbon atoms. Preferably the monoacylglycerophosphatide comprises lysolecithin and lysocephalin.

In preparing the pourable margarines sufficient monoacylglycerophosphatide is incorporated in the aqueous phase to obtain the stability required: the amount used is generally within the range of from 0.5 to 4% by weight of the aqueous phase; normally from 1 to 3.5% by weight is suitable.

The margarine may further contain a small amount of a fatty acid monoglyceride e.g. from 0.05 to 0.5% of the fatty phase.

The pourable margarines of the invention are prepared from a fatty phase, the greater part of which is composed of a glyceride oil remaining pourable at all temperatures from 5 to 35° C. Both vegetable and animal liquid oils can in principle be used for the purpose of the invention. Preferably the liquid oils are free from substantial proportions of crystallised glycerides at temperatures from 0–35° C.

Suitable liquid oils are e.g. oleins of animal fats, winterized cottonseed oil, olive oil, peanut oil and oils containing large proportions of polyunsaturated fatty acids.

Margarines containing a high content of polyunsaturated fatty acids, notably those known as essential fatty acids, are nowadays of particular interest since these products are widely believed to be dietetically beneficial.

It is therefore preferred that liquid vegetable oils containing at least 40% of polyunsaturated fatty acids are used for this purpose, e.g. sunflower, safflower, soybean, wheat germ, grapeseed, poppyseed, tobacco seed, rye, walnut or corn oil.

The hard fats which in minor proportions should be added to the liquid oil in the fatty phase of the pourable margarine are preferably substantially saturated hard fats. Such hard fats can e.g. be obtained by substantially completely hydrogenating a vegetable or animal oil, using common hydrogenation techniques e.g. as described in "Bailey's Industrial Oil and Fat Products," 3rd ed. Interscience Publishers, London 1964, pp. 866–871.

The amount of the hard fat present in the pourable margarine of the invention may vary depending on the type and melting point of the hard fat used and the process in which the emulsion is prepared.

Preferably from 1 to 5%, based on the total amount of the fatty phase, of a substantially saturated hard fat is used, e.g. substantially completely hydrogenated rapeseed oil, mustard seed oil, groundnut oil, soybean oil, sunflower oil, lard, tallow, palm oil or cotton seed oil.

The particle size of the hard fat particles present in the pourable emulsion is of great importance. Preferably hard fat of which at least 90% of the particles have a major dimension of from 0.1 to 30 microns, preferably from 0.1 to 5 microns, is used for the purpose of the invention.

The expression "aqueous phase" herein refers to water or to water with the usual water-soluble additives (see the following table) solubilized therein, which is the minor phase of the water-in-oil emulsion (margarines) of the invention.

The aqueous phase may contain water, salt, potassium sorbate, flavor, ground soybeans, or milk in the form of whole milk, cream, skim milk or reconstituted skim milk.

Some suitable compositions for the aqueous phase are set forth in the following table.

|  | Parts per million | | | | | |
| --- | --- | --- | --- | --- | --- | --- |
|  | Range [a] | 1 | 2 | 3 | 4 | 5 |
| Salt | 0–4 | 1.75 | 1.0 | 4.0 | 1.75 |  |
| Skim milk | 0–19.7 |  | 18.8 |  |  |  |
| Skim milk solids | 0–2 | 1.63 |  |  |  | 1.80 |
| Water | 0–19.7 |  |  | 15.77 | 16.30 | 17.87 |
| K-sorbate | 0–0.1 | 0.10 |  |  | 0.10 | 0.10 |
| Flavor | 0–0.03 | 0.03 |  | 0.03 | 0.03 | 0.03 |
| Ground soybeans | 0–2 |  |  |  | 1.63 |  |
| EDTA [b] | 0–75 |  |  | 75 |  |  |

[a] To a total of 19.7 to 20 parts.
[b] Disodium calcium ethylenediaminetetraacetate.

Excellent pourable margarines have been prepared containing in their fatty phase sunflower oil and from 1 to 4%, preferably 1 to 2% of fully hydrogenated rapeseed oil having a melting point of from 55 to 75° C. and an aqueous phase comprising water and/or soured skim milk together with a minor amount of monoacylglycerophosphatides.

The pourable emulsions of the present invention may be used for the preparation of foodstuffs, e.g. soups, sauces, stews, gratinated dishes and sandwiches, and especially for frying and baking purposes.

The product of the invention may be prepared by conventional margarine preparative techniques, for example by the use of scraped-surface heat exchangers, such as Votators. In such apparatus the blend of oil phase and aqueous phase, including such additives as are customary in the preparation of margarine, for example flavouring agents and coloring matter, are simultaneously blended and chilled, e.g. to from 0° to 20° C. Further details of this preparative method appear in "Margarine" by Andersen & Williams, Pergamon Press, London, 1954, pp. 228 et seq.

In a preferred process of the invention a pourable margarine is prepared by emulsifying the liquid fatty phase with an aqueous dispersion of the monoacylglycerophosphatide-containing phosphatide to produce the water-in-oil emulsion. The aqueous dispersion can be made by mixing the phosphatide containing monoacylglycerophosphatide with the remainder of the aqueous phase, for instance skim milk, and heating if necessary. This emulsion may subsequently be cooled to a temperature of from 0° to 20° C., filled into receptacles and subsequently stored for 5 to 50 hrs. at a temperautre of from 5° to 18° C.

As the emulsifying properties of monoacylglycerophosphatides are less affected by alkaline earth metal ions than diacylglycerophosphatides, it is possible to use hard water or calcium-containing protein solutions without the addition of complex-forming salts or acids. Moreover the aqueous phase can contain up to 10% of salt.

For margarine an acid pH is preferable on bacteriological grounds. The aqueous phase or the emulsion formed can be made acid to the required pH with lactic, citric, or other suitable acid, or by the action of bacteria, for instance with the addition of 0.5 to 1% of lactic acid culture where the appropriate bacterial substrate is present. Preferably the pH of the emulsion is from 4 to 5.

The invention is illustrated by the following examples:

EXAMPLE I 100 g. of commercially available crude soya phosphatide (65% phosphatides, 35% oil) was vigorously stirred to an emulsion with 80 ml. water and 20 ml. of a suspension of 0.5% pancreatin in water. The mixture was stirred for 20 hours at 55° C., after which the acid value calculated on the water-free product had increased from about 20 to 36. The aqueous suspension was dried under vacuum at 60° C. A partially hydrolysed phosphatide product was obtained having an alpha-monoacylphosphatide content of about 12%.

To a mixture of tap water (260 g.) of 12° G.H. and skim milk (140 g.) a partially hydrolysed phosphatide was added (10 g.).

To disperse the phosphatides at room temperature the pH of the water phase was brought with lye to 9. After the dispersing of the phosphatides the pH was reduced to 4.7 with the aid of lactic acid. The aqueous phase had a milky appearance and no flocculation of phosphatides could be observed. The aqueous phase obtained was dispersed in a refined fat phase (2000 g.) which was brought at 42° C. and which consisted of 98.5% sunflower oil and 1.5% fully hydrogenated rape oil with a slip melting point of 70° C. To this fat phase also 0.2% monoglycerides were added together with small quantities of coloring oil and flavors. The sunflower oil contained about 60% linoleic acid calculated on the total quantity fatty acids and it remained clear and pourable at —5° C. and higher temperatures. The water-in-oil emulsion was cooled with a laboratory votator A-unit to 4° C. and thereafter the cooled emulsion was worked in a conventional stirred crystallizer unit and filled into plastic bottles.

The oil exudation of a sample of the liquid margarine obtained was assessed after the margarine had been kept at 30° C. for 3 weeks in a glass cylinder with a diameter of 3.7 cm. and a volume of 250 ml. The cylinder was filled to a height of 10 cm. The oil exudation was expressed in percent of the margarine sample. This was compared with the results of a control sample which contained the same ingredients but of which the phosphatides were dispersed in the fatty phase. Also the spattering behavior on frying was compared with the aid of the following test:

In an enamelled pan with smooth bottom surface each time 50 g. margarine were fried at 175° C. (controlled with a thermo-couple). At a distance of 21 cm. above the pan the fat spattering away was caught on a piece of paper which had been weighed before.

After the test the paper was weighed again. The weight increase of the paper was a measure for the degree of spattering and was converted into a score as follows:

10 (very good): Less than 10 mg.
6 (moderate): 50 to 100 mg.
2 (very bad): >500 mg.

Intermediate scores express a corresponding spattering behavior.

The results were:

| | Oil exudation, 30° C., percent | Spattering test |
|---|---|---|
| Liquid margarine according to the invention | 2.5 | 8-9 |
| Control | 18.5 | 8-8 |

These results show that by incorporation of monoacylglycerophosphatides in the aqueous phase instead of in the fatty phase of a pourable margarine, a significant improvement in stability is obtained without detrimentally affecting its spattering properties.

EXAMPLES II–IV

Three liquid margarines were prepared as described in Example I, using the same ingredients, except that the proportions of fully hydrogenated rapeseed oil and monoacylglycerophosphatide were varied.

The three margarines thus prepared were compared with three margarines prepared from the same ingredients, except that unhydrolyzed phosphatide was used as emulsifier in the aqueous phase.

The results are shown in Table I.

TABLE I

| | Percent | | | | Water distribution, number of droplets per 0.01 mm.³ | | | | Spattering test | Oil separation after 3 weeks at 30° C. (percent) |
|---|---|---|---|---|---|---|---|---|---|---|
| | Liquid oil | Hard fat | Enzymatically hydrolysed phosphatide in aqueous phase | Unhydrolysed phosphatide in aqueous phase | >24 µ | 12-24 µ | 6-12 µ | 3-6 µ | | |
| Ex. No. 2 | 98.5 | 1.5 | 1.8 | | 4 | 61 | 1,460 | 5,600 | 7.5-7 | 6 |
| Control | 98.5 | 1.5 | | 1.8 | 0 | 37 | 1,000 | 6,460 | 0-0 | 10 |
| Ex. No. 3 | 98.5 | 1.5 | 3.0 | | 0 | 7 | 930 | 7,900 | 7.5-7 | 5 |
| Control | 98.5 | 1.5 | | 3.0 | 0 | 5 | 900 | 5,700 | 3.5-4 | 26 |
| Ex. No. 4 | 99.0 | 1.0 | 3.0 | | 0 | 25 | 1,350 | 7,000 | 8-8 | 16 |
| Control | 99.0 | 1.0 | | 3.0 | 2.5 | 72 | 1,800 | 8,000 | 4-3.5 | 50 |

From the results of the experiments of Table I it is to be concluded that by incorporating monoacylglycerophosphatides in the aqueous phase of a pourable margarine not only the stability against oil separation but also the spattering behavior is significantly improved as compared with the stability and spattering behavior of pourable margarines prepared with unhydolyzed phosphatides in the aqueous phase.

EXAMPLES V–VIII

Three liquid margarines were prepared as described in Example III and Table I, except that the degree of hydrolysis of the phosphatides and thus the percentage of monoacylglycerophosphatide in the phosphatide mixture was varied.

The results are shown in Table II.

TABLE II

|  | Percent monoacylglycerophosphatide in the phosphatide mixture | Percent oil separation after storage at 30° C. | | | Spattering test |
|---|---|---|---|---|---|
|  |  | 1 week | 2 weeks | 3 weeks |  |
| Control (see also Table D) | 0 | 7 | 12 | 26 | 4 |
| Ex. No. 5 | 8 | 3 | 4 | 9 | 6.8 |
| Ex. No. 6 | 15 | 4 | 6 | 8 | 8.2 |
| Ex. No. 7 | 30 | 3 | 3 | 6 | 6.8 |
| Control | 40 | 4 | 4 | 6 | 5.2 |

From the results of the experiment compiled in Table II it follows that pourable margarines containing phosphatide in the aqueous phase, from 5–35% by weight of which phosphatides are monoacylglycerophosphatides, are excellently stable against oil separation at 30° C. and possess good frying properties.

What is claimed is:

1. A pourable margarine of the water-in-oil type consisting essentially of from about 25–15% by weight of an aqueous phase emulsified with a fatty phase, said fatty phase consisting essentially of from 90–99.5% by weight of a glyceride oil which is pourable at all temperatures from 0–35° C. and the remainder of a hard fat of a slip melting point of from 40–80° C. and a particle size of at least 90% of the hard fat particles of 0.1 to 30μ, said aqueous phase containing a phosphatide, from 5–35% by weight of which is a monoacylglycerophosphatide, whose acyl group is derived from a fatty acid having at least 12 carbon atoms, said monoacylglycerophosphatide being present in a proportion of 0.5–4% by weight of the aqueous phase.

2. A pourable margarine of the water-in-oil type consisting essentially of about 20% by weight of an aqueous phase emulsified with about 80% by weight of fatty phase, said fatty phase consisting essentially of from 90–99.5% by weight of a liquid vegetable oil, at least 40% of the fatty acids of said liquid oil being polyunsaturated fatty acids, and the remainder of the fatty phase being a hard fat of a slip melting point of from 40–80° C. and a particle size of at least 90% of the hard fat particles of 0.1 to 30μ, said aqueous phase containing a phosphatide, from 5–35% by weight of which is a monoacylglycerophosphatide whose acyl group is derived from a fatty acid having at least 12 carbon atoms, said monoacylglycerophosphatide being present in a proportion of 0.5–4% by weight of the aqueous phase.

3. A margarine according to claim 1, in which 10–25% of the phosphatide is the monoacylglycerophosphatide.

4. A margarine according to claim 1, in which the acyl group of the monoacylglycerophosphatide has from 16–22 carbon atoms.

5. A margarine according to claim 1, in which the monoacylglycerophosphatide is an alpha-monoglycerophosphatide.

6. A pourable margarine according to claim 1 wherein the glyceride oil, which is pourable at temperatures from 0 to 35° C. comprises safflower, sunflower, soybean, wheat germ, grapeseed, poppyseed, rye, walnut or corn oil.

7. A pourable margarine according to claim 1 wherein the hard fat component is a substantially completely hydrogenated vegetable or animal oil.

8. A pourable margarine according to claim 1 wherein at least 90% of the hard fat particles have a major dimension of 0.1 to 5μ.

9. A process for preparing a pourable margarine according to claim 1, which comprises dispersing a phosphatide-containing aqueous phase in a liquid fat phase, from 5–35% by weight of which phosphatide being monoacylglycerophosphatide, cooling the emulsion obtained to a temperature of from 0° to 20° C., filling the cooled emulsion into receptacles and storing the filled receptacles for 5 to 50 hrs. at a temperature of from 5° to 18° C.

References Cited
UNITED STATES PATENTS 3,682,656   8/1972   Wilton et al. _____ 99—122
3,661,795   5/1972   Pardun _____ 99—123 X
3,663,235   5/1972   Menz et al. _____ 99—123

A. LOUIS MONACELL, Primary Examiner

R. B. PENLAND, Assistant Examiner

U.S. Cl. X.R.

426—340